(12) United States Patent
Kusano

(10) Patent No.: US 6,745,335 B1
(45) Date of Patent: Jun. 1, 2004

(54) POWER CONSUMPTION CONTROL OF MULTIPROCESSOR SYSTEM USING SEPARATE TIMERS FOR MONITORING PROCESSOR LOAD RISE AND DROP

(75) Inventor: Masanobu Kusano, Tokyo (JP)

(73) Assignee: NEC Corporation, Tokyo (JP)

( * ) Notice: Subject to any disclaimer, the term of this patent is extended or adjusted under 35 U.S.C. 154(b) by 641 days.

(21) Appl. No.: 09/678,592

(22) Filed: Oct. 4, 2000

(30) Foreign Application Priority Data

Oct. 12, 1999 (JP) ............................................ 11-290235

(51) Int. Cl.⁷ ................................................ G06F 1/26
(52) U.S. Cl. ...................... 713/324; 713/502; 709/224
(58) Field of Search ................. 713/324, 502; 709/224

(56) References Cited

U.S. PATENT DOCUMENTS 5,737,615 A * 4/1998 Tetrick ........................ 713/324
5,913,068 A * 6/1999 Matoba ....................... 713/322
6,141,762 A * 10/2000 Nicol et al. ................. 713/300

FOREIGN PATENT DOCUMENTS

JP          5-257907        10/1993

* cited by examiner

Primary Examiner—Thomas Lee
Assistant Examiner—Albert Wang
(74) Attorney, Agent, or Firm—Scully, Scott, Murphy & Presser

(57) ABSTRACT

In a multiprocessor system having two CPUs 11-1 and 11-2, processor load monitoring units 12-1 and 12-2 are monitoring the loads on the respective CPUs, and each processor load monitoring unit notifies the corresponding CPU of any drop or rise in load by generating interruption. If this notification reveals a drop in the load working on the CPU 11-1 or 11-2, the CPU is degenerated and power supply to the CPU is stopped. On the other hand, if a rise in the load working on the CPU 11-1 or 11-2 is perceived, power supply to the already degenerated CPU is resumed, and the CPU is added to the multiprocessor system.

5 Claims, 4 Drawing Sheets

POWER CONSUMPTION CONTROL OF MULTIPROCESSOR SYSTEM USING SEPARATE TIMERS FOR MONITORING PROCESSOR LOAD RISE AND DROP

BACKGROUND OF THE INVENTION

1. Field of the Invention

The present invention relates to a multiprocessor system, and more particularly a power consumption control apparatus, a power consumption control method and a recording medium recording thereon a power consumption control program for power saving.

2. Description of the Related Art

A multiprocessor system, being composed of a plurality of processors, tends to be power consuming. Whereas distributed processing is performed in a multiprocessor system by a plurality of processors when the load on the processors is heavy, there is no need to involve all the processors in distributed processing when the load is light. Therefore, having all the processors operate when the load is light would mean wasteful power consumption.

For this reason, techniques to reduce power consumption in such situations are already known according to the prior art, including what is described in the Japanese Patent Application Laid-open No. Hei 5-257907. This technique uses, among other things, two processors and a circuit to control the supply and cut-off of clocks to these processors. Software monitors the load on the processors and, when the load is found to be lighter than a certain level, the supply of clocks to one of the processors is stopped to thereby save the consumption of power.

Therefore, according to the prior art, the load on the processors is monitored by software. However, this load monitoring imposes an extra processing load on the processors, resulting in the problem of an increased overall load on the processors.

SUMMARY AND OBJECTS OF THE INVENTION

An object of the present invention, therefore, is to eliminate the additional load on the processors imposed by the monitoring need, and to efficiently control the consumption of power according to the level of load on the processors.

A power consumption control apparatus in a first multiprocessor system according to the invention is provided with a load monitoring means for monitoring any drop or rise in the loads on the processors, and a processor degenerating/adding means for degenerating part of the plurality of processors when a drop in load is detected by the load monitoring means and suspending the supply of power to the degenerated processor(s) and, when a rise in load is detected, resuming the supply of power to the degenerated processor(s) to add the processor(s) to the multiprocessor system.

A power consumption control apparatus in a second multiprocessor system according to the invention is a variation of the power consumption control apparatus in the first multiprocessor system, wherein the load monitoring means is provided with a first detecting means for detecting a drop in the loads on the processors by the lapse of a first fixed length of time; a second detecting means for detecting a rise in the loads on the processors by the lapse of a second fixed length of time; and an interruption generating means for generating interruption to the processor(s) when either the first detecting means or the second detecting means detects either a drop or a rise in load.

A first power consumption control method for a multiprocessor system having a plurality of processors according to the invention comprises a load monitoring step to monitor any drop or rise in the loads on the processors, and a processor degenerating/adding step to degenerate part of the plurality of processors when a drop in load is detected at the load monitoring step and to suspend the supply of power to the degenerated processor(s) and, when a rise in load is detected, to resume the supply of power to the degenerated processor(s) to add the processor(s) to the multiprocessor system.

A second power consumption control method for a multiprocessor system having a plurality of processors according to the invention comprises a first detecting step to detect a drop in the loads on the processors by the lapse of a first fixed length of time; a second detecting step to detect a rise in the loads on the processors by the lapse of a second fixed length of time; an interruption generating step to generate interruption to the processor(s) when either a drop or a rise in load is detected at either the first detecting step or the second detecting step; and a processor degenerating/adding step, actuated by interruption at the interruption generation step, to degenerate part of the plurality of processors when a drop in load occurs and to suspend the supply of power to the degenerated processor(s) and, when a rise in load occurs, to resume the supply of power to the degenerated processor(s) to add the processor(s) to the multiprocessor system.

A first recording medium for a multiprocessor system having a plurality of processors according to the invention records thereon a program for carrying out load monitoring to monitor any drop or rise in the loads on the processors, and processor degeneration/addition to degenerate part of the plurality of processors when a drop in load is detected by the load monitoring and to suspend the supply of power to the degenerated processor(s) and, when a rise in load is detected, to resume the supply of power to the degenerated processor(s) to add the processor(s) to the multiprocessor system.

A second recording medium for a multiprocessor system having a plurality of processors according to the invention records thereon a program for first detection to detect a drop in the loads on the processors by the lapse of a first fixed length of time; second detection to detect a rise in the loads on the processors by the lapse of a second fixed length of time; interruption generation to generate interruption to the processor(s) when either a drop or a rise in load is detected by either the first detection or the second detection; and processor degeneration/addition, actuated by interruption at the interruption generation, to degenerate part of the plurality of processors when a drop in load occurs and to suspend the supply of power to the degenerated processor(s) and, when a rise in load occurs, to resume the supply of power to the degenerated processor(s) to add the processor(s) to the multiprocessor system.

BRIEF DESCRIPTION OF THE DRAWINGS

The present invention will be understood more fully from the detailed description given here below and from the accompanying drawings of preferred embodiments of the invention, which, however, should not be regarded as limiting the invention but are only for explaining and facilitating the understanding thereof.

Here, it should be noted that like reference numerals represent like elements throughout the disclosure.

DETAILED DESCRIPTION OF THE PREFERRED EMBODIMENTS

Next, the present invention will be described with reference to the drawings.

First will be described in detail a first preferred embodiment of the invention.

Figure 1:
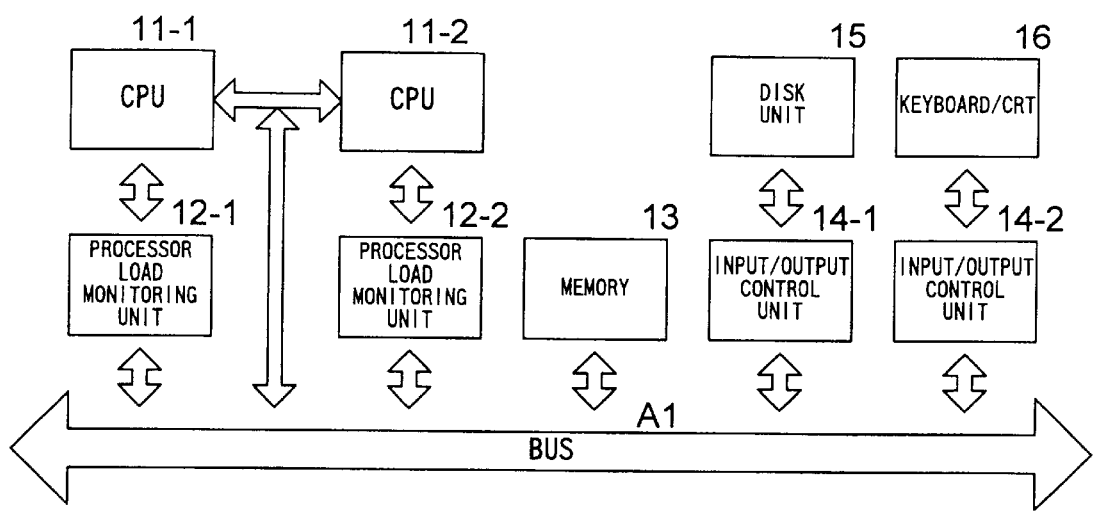
FIG. 1 is a block diagram illustrating the configuration of a multiprocessor system, which is a first preferred embodiment of the invention.

FIG. 1 is a block diagram illustrating the configuration of a multiprocessor system, which is a first preferred embodiment of the invention. In this diagram, reference numerals 11-1 and 11-2 denote two central processing units (CPUs); 12-1, a processor load monitoring unit for monitoring the load on the CPU 11-1; 12-2, a processor load monitoring unit for monitoring the load on the CPU 11-2; 13, a memory for storing programs and data to be used by the CPUs 11-1 and 11-2; 15, a disk unit such as a magnetic disk, an optical disk or the like; 16, a keyboard or a CRT display; 14-1, an input/output control unit connected to and controlling inputs to and outputs from the disk unit 15; and 14-2, an input/output control unit connected to and controlling inputs to and outputs from the keyboard or the CRT display 16. The CPUs 11-1 and 11-2 are connected to and access the memory 13 and the input/output control units 14-1 and 14-2 via a bus A1. The processor load monitoring units 12-1 and 12-2 are connected to the CPUs 11-1 and 11-2, respectively.

Figure 2:
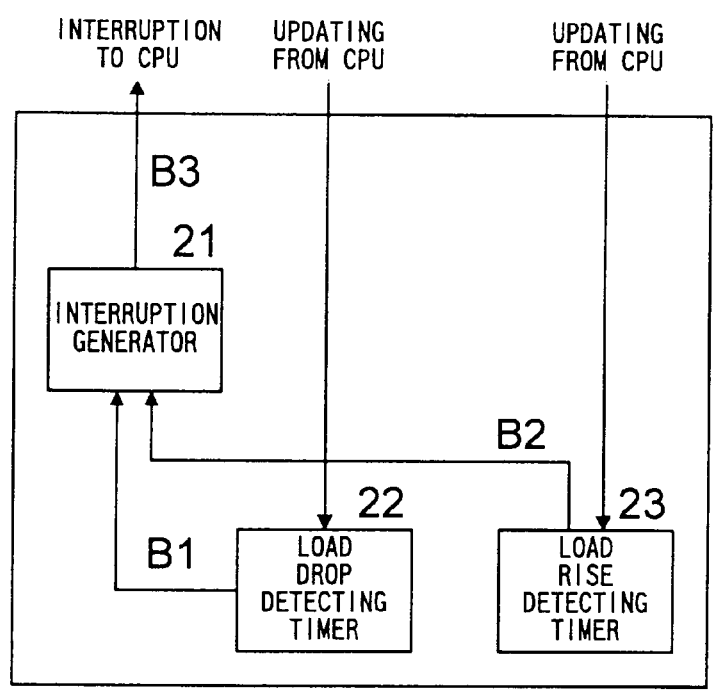
FIG. 2 is a block diagram of processor load monitoring units 12-1 and 12-2 of the multiprocessor system, which is the first preferred embodiment of the invention.

FIG. 2 is a block diagram of processor load monitoring units 12-1 and 12-2 of the multiprocessor system, which is the first preferred embodiment of the invention. In this diagram, a load drop detecting timer 22 and a load rise detecting timer 23 measure the time until their respective monitoring periods set by the CPU 11-1 or 11-2 expire. When each timer detects the expiration of the monitoring period, the load drop detecting timer 22 supplies a time-out signal B1, and the load rise detecting timer 23, a time-out signal B2. As these time-out signals B1 and B2 are entered, an interruption generator 21 supplies an interruption signal B3 to the CPU 11-1 or 11-2. The load drop detecting timer 22 and the load rise detecting timer 23 stop measuring the time when an update setting of load monitoring is entered by the CPU 11-1 or 11-2, and restarts measuring the monitoring time.

Figure 3:
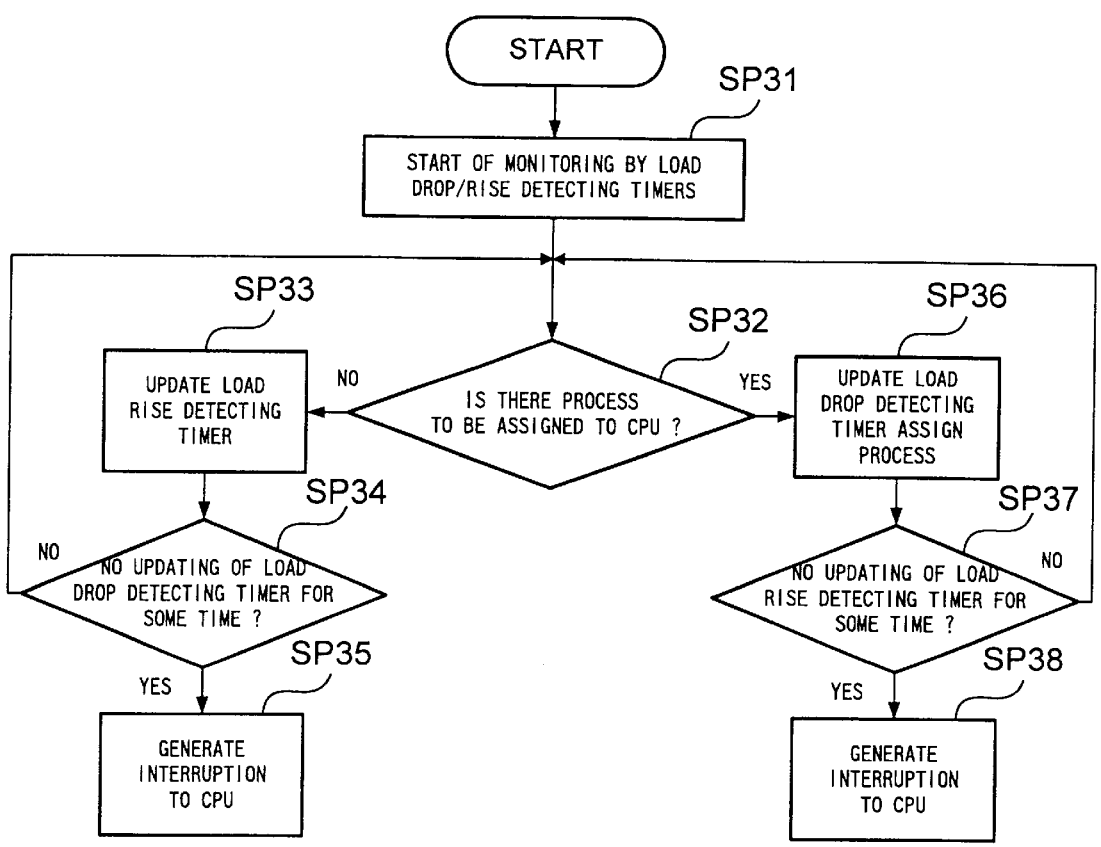
FIG. 3 is a flow chart for explaining the operation of the multiprocessor system, which is the first embodiment of the invention.

Next will be described, with reference to FIG. 3 and FIG. 4, a power consumption control method for the multiprocessor system in the first mode of implementing the invention, using the processor load monitoring units 12-1 and 12-2. FIG. 3 is a flow chart of the operation using the processor load monitoring units 12-1 and 12-2 to detect a drop and a rise in the loads on the CPU 11-1 and 11-2. Referring to this flow chart, the operating system (OS) executed on each CPU, when the multiprocessor system is started up, first sets monitoring periods for the load drop detecting timer 22 and the load rise detecting timer 23 provided in the respective processor load monitoring units, and causes them to measure these monitoring periods (step SP31). During the operation of the multiprocessor system, each OS judges whether or not there is any process (task) to be assigned to its own CPU (step SP32). If there is no process to be assigned its own CPU (the judgment at step SP32 is "NO"), the OS does not update load monitoring by the load drop detecting timer 22 provided in its own processor load monitoring unit, and updates load monitoring by the load rise detecting timer 23 (step SP33). In this procedure, the load drop detecting timer 22 judges whether or not the monitoring period has expired (step SP34). If the updating of load monitoring is not set for a certain length of time and the expiration of the monitoring period is detected (the judgment at step SP34 is "YES"), the interruption generator 21 generates interruption to its own CPU (step SP35). If the judgment at step SP34 is "NO" the processing returns to step SP32.

If in this way the updating of load monitoring is not set for the load drop detecting timer 22 for a certain length of time, in other words there is no process to be assigned to the CPU for a certain length of time, it can be regarded as meaning a drop in the load working on the CPU. Therefore, a drop in the load on the CPU can be detected by this method.

On the other hand, if the OS finds a process to be assigned to its own CPU (the judgment at step SP32 is "YES"), the OS does not update load monitoring by the load rise detecting timer 23 provided in its own processor load monitoring unit, but updates load monitoring by the load drop detecting timer 22, and assigns a process to its own CPU (step SP36). In this case, the load rise detecting timer 23 judges whether or not the monitoring period has expired (step SP37). If updating of load monitoring has not been set for a certain length of time and the expiration of the monitoring period is detected (the judgment at step SP37 is "YES"), the interruption generator 21 generates interruption to its own CPU (step SP38). If the judgment at step SP37 is "NO" the processing returns to step SP32.

If the updating of load monitoring is thus not set for the load rise detecting timer 23 for a certain length of time, in other words a process is constantly assigned to the CPU for a certain length of time, it can be regarded as meaning a rise in the load working on the CPU. Therefore, a rise in the load on the CPU can be detected by this method.

Figure 4:
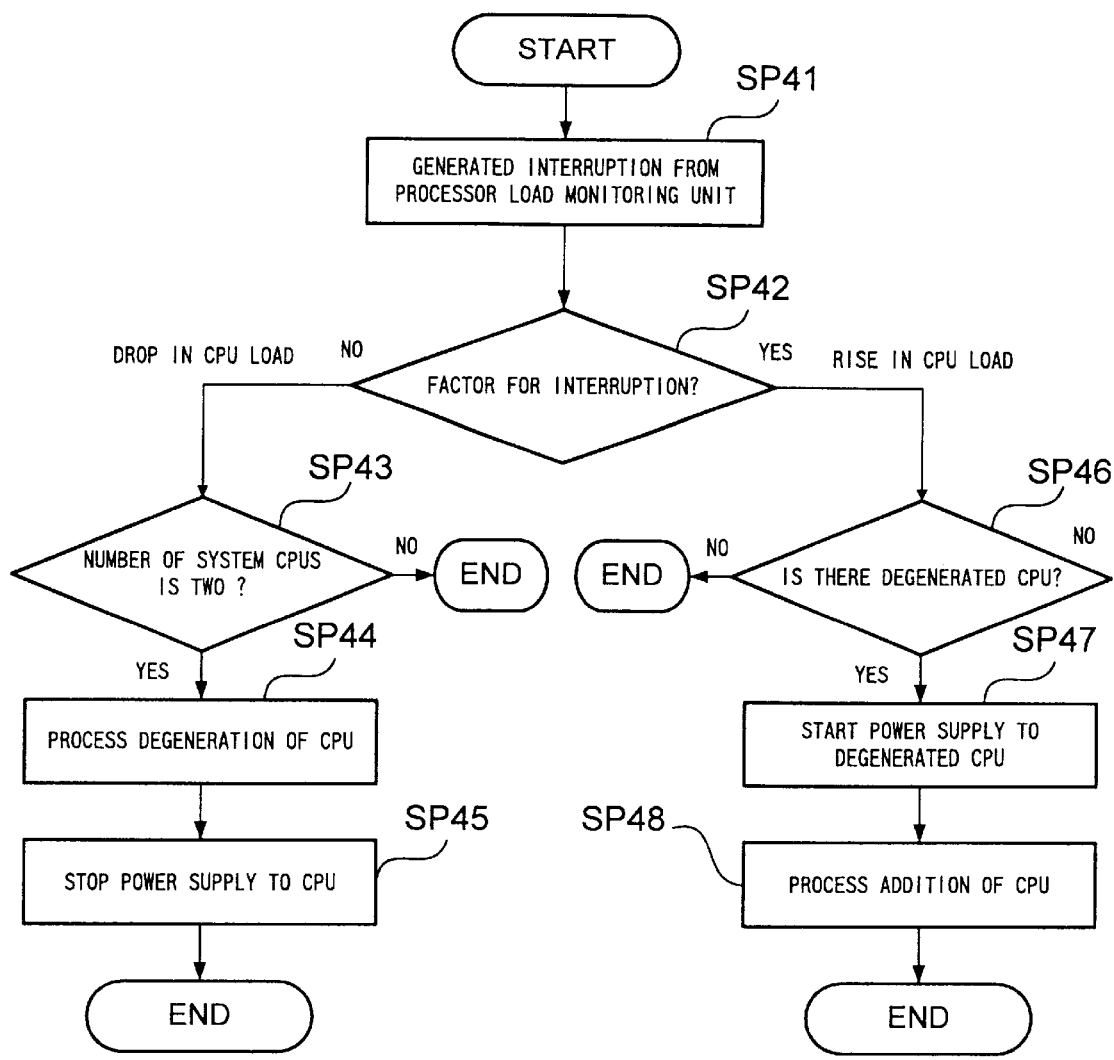
FIG. 4 another flow chart for explaining the operation of the multiprocessor system, which is the first embodiment of the invention.

Next, FIG. 4 is a flow chart of the operation to process interruption from the processor load monitoring units 12-1 and 12-2. In this flow chart, if the OS first finds the generation of interruption from its own processor load monitoring unit (step SP41), the OS determines the factor responsible for the generation of the interruption (step SP42). If the reason for the generation of this interruption is a drop in the load on its own CPU, it is further judged whether or not the number of CPUs of the multiprocessor system is two (step SP43). If the judgment is "NO" the processing of interruption is ended. However, if the judgment at step SP43 is "YES" the processing to degenerate the CPU having suffered the interruption is carried out (step SP44). Upon completion of this degeneration processing, the supply of power to the degenerated CPU is stopped (step SP45).

On the other hand, if the judgment at step SP42 points to a rise in the load on the CPU, it is judged whether or not there is an already degenerated CPU on the multiprocessor system (step SP46). If the judgment is "NO" the processing of interruption is ended. However, if the judgment at step SP46 is "YES" the supply of power to that degenerated CPU is started (step SP47). Then, CPU addition is processed to make this CPU usable in the multiprocessor system (step SP48).

Incidentally, another method for the OS to determine the factor responsible for the generation of interruption at step SP42 is, for instance, to notify which of the load drop detecting timer 22 and the load rise detecting timer 23 has detected the expiration of the monitoring period at the same time as the generation of interruption by the processor load monitoring unit 12-1 or 12-2. Still another method is to hold, as the state of detection, information as to whether a load drop or a load rise was detected by the processor load monitoring unit 12-1 or 12-2, and the OS reads in this state of detection at the time of the generation of interruption so as to determine the factor responsible for the interruption.

In this way, when the processor load has dropped, power consumption can be saved by degenerating a processor and stopping the power supply to it. When the load has risen again, the loads on processors is distributed by adding the degenerated processor to the multiprocessor system, and accordingly the processing capacity expected of the multiprocessor system can be realized.

Furthermore, as the loads on the CPUs 11-1 and 11-2 are monitored by the processor load monitoring units 12-1 and 12-2 and interruption is generated to notify the OS of any drop or rise in load, there is no need to use software for monitoring the loads on the CPUs unlike in the case of the prior art. As a result, the otherwise inevitable increase in the loads on the processors ensuing from load monitoring can be eliminated, and it is possible to efficiently control power consumption according to the level of loads on the processors.

Incidentally, although the multiprocessor system in the above-described mode of implementation is configured of two CPUs, it may instead be a multiprocessor system consisting of three or more CPUs with a similarly satisfactory result.

Furthermore, by varying the length of the monitoring period of the load drop detecting timer 22 or the load rise detecting timer 23 provided in the processor load monitoring unit, the state of the load working on each CPU can be monitored more flexibly.

Next will be described a second preferred embodiment of the present invention.

The second preferred embodiment of the invention is further provided with a recording medium whereon a power consumption control program is recorded. This recording medium may be a floppy disk, a magnetic disk, a semiconductor memory, or some other recording medium.

The power consumption control program is read from the recording medium into the multiprocessor system to control the operation of the multiprocessor system. The multiprocessor system executes under the control of the power consumption control program the same processing as in the first mode of implementation.

As hitherto described, according to the invention, in a multiprocessor system having a plurality of processors, a processor load monitoring unit is provided for each processor, and this processor load monitoring unit, i.e. hardware, monitors the load working on the processors, and notifies the processors of any drop or rise in the load by generating interruption. If this notification reveals a drop in load working on a processor, the processor is degenerated and the power supply to the processor is stopped. On the other hand, if a rise in the load working on a processor is revealed, power supply to the already degenerated processor is resumed, and the processor is added to the multiprocessor system with the result that, compared with load monitoring by software, there is no increase in the loads on the processors and power consumption can be efficiently controlled according to the level of loads on the processors.

Although the invention has been described in detail above with reference to various preferred embodiments thereof, it will be appreciated by those skilled in the art that these embodiments have been provided solely for the purposes of illustration, and are in no way to be regarded as limiting the invention. Instead, various modifications and substitutions of equivalent techniques will be readily apparent to those skilled in the art upon reading this specification, and such modifications and substitutions are to be regarded as falling within the true scope and spirit of the following claims.

What is claimed is:

1. A power consumption control apparatus in a multiprocessor system having a plurality of processors, comprising:
   a load monitoring means of monitoring any drop or rise in the loads on said processors, and
   a processor degenerating/adding means for degenerating part of said plurality of processors when a drop in load is detected by said load monitoring means and suspending the supply of power to the degenerated processor(s) and, when a rise in load is detected, resuming the supply of power to the degenerated processor(s) to add the processor(s) to said multiprocessor system wherein:
   said load monitoring means is provided with:
   a first detecting means for detecting a drop in the loads on said processors by the lapse of a first fixed length of time;
   a second detecting means for detecting a rise in the loads on said processors by the lapse of a second fixed length of time; and
   an interruption generating means for generating interruption to said processors when either said first detecting means or said second detecting means detects either a drop or a rise in load.

2. A power consumption control method for a multiprocessor system having a plurality of processors, comprising:
   a first detecting step to detect a drop in the loads on said processors by the lapse of a first fixed length of time;
   a second detecting step to detect a rise in the loads on said processors by the lapse of a second fixed length of time;
   an interruption generating step to generate interruption to said processors when either a drop or a rise in load is detected at either said first detecting step or said second detecting step; and
   a process degenerating/adding step, actuated by interruption at said interruption generation step, to degenerate part of said plurality of processors when a drop in load occurs and to suspend the supply of power to the degenerated processor(s) and, when a rise in loads occurs, to resume the supply of power to the degenerated processor(s) to add the processor(s) to said multiprocessor system.

3. A recording medium recording thereon a program enabling a multiprocessor system having a plurality of processors to carry out:
   first detection to detect a drop in the loads on said processors by the lapse of a first fixed length of time;
   second detection to detect a rise in the loads on said processors by the lapse of a second fixed length of time;
   interruption generation to generate interruption to said processor(s) when either a drop or a rise in load is detected by either said first detection or said second detection; and processor degeneration/addition, actuated by interruption at said interruption generation, to degenerate part of said plurality of processors when a drop in load occurs and to suspend the supply of power to the degenerated processor(s) and, when a rise in load occurs, to resume the supply of power to the degenerated processor(s) to add the processor(s) to said multiprocessor system.

4. A group of recording media, wherein said program claimed in claim 3 is divided into a plurality of portions and said portions are recorded on said media on a shared basis.

5. A program realized as electric signals enabling a multiprocessor system having a plurality of processors to carry out:

first detection to detect a drop in the loads on said processors by the lapse of a first fixed length of time;

second detection to detect a rise in the loads on said processors by the lapse of a second fixed length of time;

interruption generation to generate interruption to said processor(s) when either a drop or a rise in load is detected by either said first detection or said second detection; and processor degeneration/addition, actuated by interruption at said interruption generation, to degenerate part of said plurality of processors when a drop in load occurs and to suspend the supply of power to the degenerated processor(s) and, when a rise in load occurs, to resume the supply of power to the degenerated processor(s) to add the processor(s) to said multiprocessor system.

* * * * *